US008521965B2

(12) United States Patent
Saha et al.

(10) Patent No.: US 8,521,965 B2
(45) Date of Patent: *Aug. 27, 2013

(54) HARDWARE ACCELERATION FOR A SOFTWARE TRANSACTIONAL MEMORY SYSTEM

(75) Inventors: Bratin Saha, Santa Clara, CA (US); Ali-Reza Adl-Tabatabai, San Jose, CA (US); Quinn Jacobson, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/782,518

(22) Filed: May 18, 2010

(65) Prior Publication Data

US 2010/0229043 A1 Sep. 9, 2010

Related U.S. Application Data

(63) Continuation of application No. 11/926,423, filed on Oct. 29, 2007, now Pat. No. 7,958,319, which is a continuation of application No. 11/349,787, filed on Feb. 7, 2006, now abandoned.

(51) Int. Cl.
G06F 12/10 (2006.01)

(52) U.S. Cl.
USPC ........................................................ 711/145

(58) Field of Classification Search
None
See application file for complete search history.

(56) References Cited

U.S. PATENT DOCUMENTS

| 5,263,155 | A | * | 11/1993 | Wang | 707/695 |
| 5,428,761 | A | * | 6/1995 | Herlihy et al. | 711/130 |
| 5,699,500 | A | * | 12/1997 | Dasgupta | 714/1 |
| 5,754,819 | A | * | 5/1998 | Lynch et al. | 711/218 |
| 5,812,798 | A | * | 9/1998 | Moyer et al. | 710/307 |
| 5,940,839 | A | * | 8/1999 | Chen et al. | 1/1 |
| 6,052,760 | A | | 4/2000 | Bauman et al. | |
| 6,125,371 | A | | 9/2000 | Bohannon et al. | |
| 6,148,300 | A | | 11/2000 | Singhal et al. | |
| 6,195,709 | B1 | | 2/2001 | Gupner et al. | |

(Continued)

FOREIGN PATENT DOCUMENTS

| WO | 2007092422 A2 | 8/2007 |
| WO | 2007092422 A3 | 10/2008 |

OTHER PUBLICATIONS

Energy Reduction in Multiprocessor System Using Transactional Memory, Tali Moreshet, R. Iris Bahar and Mauruce Herlihy, ACM 2005.*

(Continued)

*Primary Examiner* — Duc Doan
(74) *Attorney, Agent, or Firm* — Barnes & Thornburg LLP

(57) ABSTRACT

A method and apparatus for accelerating transactional execution. Barriers associated with shared memory lines referenced by memory accesses within a transaction are only invoked/executed the first time the shared memory lines are accessed within a transaction. Hardware support, such as a transaction field/transaction bits, are provided to determine if an access is the first access to a shared memory line during a pendency of a transaction. Additionally, in an aggressive operational mode version numbers representing versions of elements stored in shared memory lines are not stored and validated upon commitment to save on validation costs. Moreover, even in a cautious mode, that stores version numbers to enable validation, validation costs may not be incurred, if eviction of accessed shared memory lines do not occur during execution of the transaction.

15 Claims, 5 Drawing Sheets

(56) References Cited

U.S. PATENT DOCUMENTS

| | | | |
|---|---|---|---|
| 6,353,881 | B1 | 3/2002 | Chaudhry et al. |
| 6,463,511 | B2 | 10/2002 | Boatright et al. |
| 6,684,398 | B2 | 1/2004 | Chaudhry et al. |
| 6,704,841 | B2 | 3/2004 | Chaudhry et al. |
| 6,721,855 | B2 | 4/2004 | Chaudhry et al. |
| 6,804,243 | B1 | 10/2004 | Humphrey et al. |
| 6,823,511 | B1 * | 11/2004 | McKenney et al. ........... 718/102 |
| 6,862,664 | B2 | 3/2005 | Tremblay et al. |
| 7,167,956 | B1 * | 1/2007 | Wright et al. ................. 711/141 |
| 7,213,109 | B1 * | 5/2007 | Bauman et al. ............... 711/133 |
| 7,269,694 | B2 * | 9/2007 | Tremblay et al. ............. 711/141 |
| 7,389,383 | B2 | 6/2008 | Tremblay et al. |
| 7,809,903 | B2 | 10/2010 | Adl-tabatabai et al. |
| 2002/0161815 | A1 | 10/2002 | Bischof et al. |
| 2002/0177831 | A1 | 11/2002 | Daley et al. |
| 2004/0015642 | A1 | 1/2004 | Moir et al. |
| 2004/0017381 | A1 | 1/2004 | Butcher |
| 2004/0153687 | A1 | 8/2004 | Moir et al. |
| 2004/0187115 | A1 | 9/2004 | Tremblay et al. |
| 2004/0187116 | A1 | 9/2004 | Tremblay et al. |
| 2004/0187123 | A1 | 9/2004 | Tremblay et al. |
| 2005/0149697 | A1 * | 7/2005 | Enright et al. ................. 712/214 |
| 2005/0198045 | A1 * | 9/2005 | Wu et al. ....................... 707/100 |
| 2005/0289546 | A1 * | 12/2005 | Shpeisman et al. ........... 718/100 |
| 2006/0085588 | A1 | 4/2006 | Rajwar et al. |
| 2006/0085591 | A1 | 4/2006 | Kumar et al. |
| 2006/0288173 | A1 | 12/2006 | Shen |
| 2007/0143755 | A1 | 6/2007 | Sahu et al. |
| 2007/0156780 | A1 | 7/2007 | Saha et al. |
| 2007/0157202 | A1 | 7/2007 | Moir et al. |

OTHER PUBLICATIONS

Office Action Received for European Patent Application No. 07 717 199.9-2211 mailed on Aug. 27, 2010, 5 Pages of Office Action.

International Preliminary Report on Patentability and Written Opinion received for PCT Application No. PCT/US2007/003112, Mailed on Oct. 2, 2008, 12 pages.

International Search Report and Written Opinion received for PCT Application No. PCT/US2007/003112, Mailed on Sep. 3, 2008, 15 pages.

Mark, Moir, "Hybrid Transactional Memory", Jul. 2005, 15 Pages.

Saha, Bratin et al., "Architectural Support for Software Transactional Memory", In 39th Annual IEEE/ACM International Symposium on Microarchitecture, Dec. 2006.

Ennals, Robert, "Efficient Software Transactional Memory", 2003, 16 Pages.

Shavit et al., "Software Transactional Memory", proceedings of the Annual ACM Symposium on Principles of Distributed Computing, pp. 1-34.

Herlihy et al., "Transactional Memory Architectural Support for Lock-Free Data Structures", Proceedings of the Annual International Symposium on Computer Architecture, May 1993.

European Search Report received for European Patent Application No. 12001665.4, mailed Aug. 29, 2012, 3 pages.

Official Communication received for European Patent Application No. 12001665.4, mailed Sep. 14, 2012, 5 pages.

Office Action received for Chinese Patent App. No. 200780002017.9, mailed Jun. 18, 2012, 4 pages of Chinese Office Action and 2 pages of unofficial English translation.

European Search Report received for European Patent Application No. 12006273.2, mailed Jan. 24, 2013, 4 pages.

Notice of Grant received for Chinese Patent Application No. 200780002019.9, mailed Feb. 5, 2013, 4 pages of Chinese Notice of Grant and 4 pages of unofficial English translation.

Official Communication received for European Patent Application No. 12006273.2, mailed Feb. 5, 2013, 8 pages.

\* cited by examiner

HARDWARE ACCELERATION FOR A SOFTWARE TRANSACTIONAL MEMORY SYSTEM

This application is a continuation application of U.S. application Ser. No. 11/926,423, entitled "HARDWARE ACCELERATION FOR A SOFTWARE TRANSACTIONAL MEMORY SYSTEM," filed Oct. 29, 2007, now U.S. Pat. No. 7,958,319, which is a continuation of U.S. application Ser. No. 11/349,787, entitled "HARDWARE ACCELERATION FOR A SOFTWARE TRANSACTIONAL MEMORY SYSTEM," filed Feb. 7, 2006 now abandoned.

FIELD

This invention relates to the field of processor execution and, in particular, to acceleration of transactional execution.

BACKGROUND

Advances in semi-conductor processing and logic design have permitted an increase in the amount of logic that may be present on integrated circuit devices. As a result, computer system configurations have evolved from a single or multiple integrated circuits in a system to multiple cores and multiple logical processors present on individual integrated circuits. An integrated circuit typically comprises a single processor die, where the processor die may include any number of cores or logical processors.

As an example, a single integrated circuit may have one or multiple cores. The term core usually refers to the ability of logic on an integrated circuit to maintain an independent architecture state, where each independent architecture state is associated with at least some dedicated execution resources. As another example, a single integrated circuit or a single core may have multiple logical processors for executing multiple software threads, which is also referred to as a multi-threading integrated circuit or a multi-threading core. Multiple logical processors usually share common data caches, instruction caches, execution units, branch predictors, control logic, bus interfaces, and other processor resources, while maintaining a unique architecture state for each logical processor.

The ever increasing number of cores and logical processors on integrated circuits enables more software threads to be executed. However, the increase in the number of software threads that may be executed simultaneously has created problems with synchronizing data shared among the software threads. One common solution to accessing shared data in multiple core or multiple logical processor systems comprises the use of locks to guarantee mutual exclusion across multiple accesses to shared data. However, the ever increasing ability to execute multiple software threads potentially results in false contention and a serialization of execution.

Another solution is using transactional execution to access shared memory to execute instructions and operate on data. Often transactional execution includes speculatively executing a grouping of a plurality of micro-operations, operations, or instructions. During speculative execution of a transaction by a processor, core, or thread, the memory locations read from and written to are tracked to see if another processor, core, or thread accesses those locations. If another thread invalidly alters those locations, the transaction is restarted and it is re-executed from the beginning. Transaction execution potentially avoids deadlock associated with traditional locking mechanisms, provides error recovery, and makes fine-grained synchronization possible.

Previously, transactional execution has been implemented either fully in hardware, which requires complex and expensive logic but is relatively fast, or software, which is less expensive and more robust but incurs significant performance overhead in certain situations. For example, software transactional memory is able to efficiently execute nested transactions, but a significant amount of execution time and resources are wasted due to the instrumentation of memory accesses inside a transaction. The instrumentation is to ensure that different transaction accesses disjointed memory locations. For example, when a single thread is running, in certain cases, software transactional memory incurs a 2-3× performance overhead compared to a traditional lock based implementation. In software implemented systems typically the greatest overhead is found in tracking load accesses to locations and validating locations accessed before committing a transaction.

In contrast, in a hardware only transactional memory system, a transaction may be executed faster, as software is not needed to track each access; however, transaction size as well as functionality is sacrificed, because of the expensive and complex circuitry/logic required. Some recent research proposals have focused on forms of hybrid transactional execution where a transaction is first executed in hardware and, upon failure, executed in software. However, some performance features that are achieved through software still have to incur the overhead associated with executing the transaction in hardware first, before the advantages are realized.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as examples of specific hardware support for transactional execution, specific types of local memory in processors, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, demarcation of transactions, architectures of multi-core and multi-threaded processors, and specific operational details of microprocessors, have not been described in detail in order to avoid unnecessarily obscuring the present invention.

The method and apparatus described herein are for accelerating execution of transactions in a processor. However, the methods and apparatus for accelerating execution of transactions in a processor are not so limited, as they may be implemented on or in association with any integrated circuit device or system, such as cell phones, personal digital assistants, embedded controllers, mobile platforms, desktop platforms, and server platforms.

Processors

Figure 1:
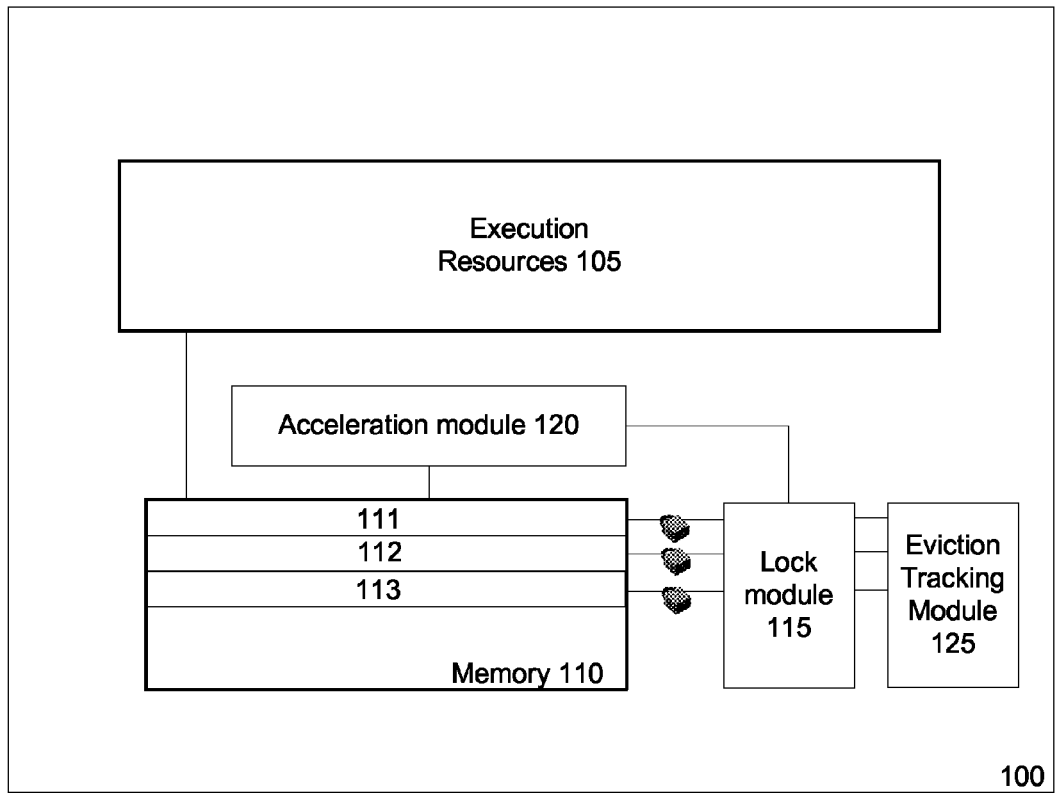
FIG. 1 illustrates an embodiment of a processor for providing accelerated transactional execution.

Referring to FIG. 1, an embodiment of processing element 100, which is capable of transactional execution, is illustrated. Processing element 100 may be any element for executing instructions or operating on data. Examples of processing element 100 include a processor, microprocessor, multi-resource host processor, a microprocessor, a processing core, a logical processor, and an embedded processor, a multi-threaded processor, and a multi-core processor.

In one of the examples below, reference to a multi-resource processor is made. Often a resource is referred to as a processor core, logical processor, or threaded processor. Consequently, a multi-resource processor includes a processor with multiple cores, logical processors, threads, or any combination thereof. A core, as used herein, refers to any logic located on an integrated circuit capable to maintain an independent architecture state, wherein each independently maintained architecture state is associated with at least some dedicated execution resources. In contrast, a logical processor typically refers to any logic located on an integrated circuit capable to maintain an independent architecture state, wherein the independently maintained architecture states share access to execution resources. Often, both a core and logical processor are capable to execute a thread. Therefore, a multi-resource processor may also refer to any processor capable of executing multiple threads.

Processor 100 may include any combination of cores or threads, such as a multi-core processor where each core supports execution of multiple software threads. Note that processor 100 is capable of individual execution within a system or may be combined with other processing elements in a multiple physical processor system. In one embodiment, to support speculative execution of transactions, processor 100 is capable of speculative execution. Other potential execution capabilities of processor 100 include in-order execution, out-of-order execution, serial execution, parallel execution, fixed point execution, floating-point execution, or other well-known types of execution. Specific examples of execution logic and resources are discussed below in reference to the execution resources section.

Shared Memory/Cache

Memory 110 is also illustrated in FIG. 1 coupled to execution resources 105. Memory 110 includes any storage elements or devices to be accessed by execution resources 105, such as cores, logical processors, or threads. In one embodiment, memory 110 is a shared memory shared by at least two processing resources, such as a core, thread, logical processor, or remote agent. Examples of memory 125 include a cache, a plurality of registers, a register file, a static random access memory (SRAM), a plurality of latches, or other storage elements. Note that processor 100 or any processing resources on processor 100 may be addressing a system memory location, a virtual memory address, a physical address, or other address when reading from or writing to a memory location with memory 110. Memory 110 will be discussed in more detail in reference to the exemplary embodiments below.

As a specific illustrative example, assume that memory 110 is a cache memory, such as a trace cache, a first-level cache, a second-level cache, or a higher-level cache. Cache 110 includes cache lines 111, 112, and 113, which may also be referred to as memory locations within memory 110. Cache 110 and lines 111-112 may be organized in any manner, such as a fully associative cache, a set-associative cache, a direct mapped cache, or other known cache organization.

As another example, assume memory 110 is a plurality of registers used by a processing element or resource as execution space or scratch pad to store variables, instructions, or data. In this example, memory locations 111-112 in grouping of registers 110 are registers 111, 112, and 113.

In one embodiment, lines, locations, or words 111-112 in memory 110 are capable of storing one element. An element refers to any instruction, operand, data operand, variable, or other grouping of logical values that is commonly stored in memory. In an alternative embodiment, memory lines 111-112 are each capable of storing a plurality of elements per line. As an example, cache line 111 stores four elements including an instruction and two operands. The elements stored in cache line 111 may be in a packed or compressed state, as well as an uncompressed state. Multiple elements per shared memory line are discussed in more detail below in reference to FIG. 2.

Logical Values

As stated above, memory 110, as well as other features and devices in processor 100, store and operate on logic values. Often, the use of logic levels, logic values, or logical values is also referred to as 1's and 0's, which simply represents binary logic states. For example, a 1 refers to a high logic level and 0 refers to a low logic level. Other representations of values in computer systems have been used, such as decimal and hexadecimal representation of logical values or binary values. For example, take the decimal number 10, which is represented in binary values as 1010 and in hexadecimal as the letter A.

In many older systems a high voltage level was represented by a voltage, e.g. 5V, and a low voltage level, e.g. 0V. As another specific example, a high logic level is at 1.2V and a low logic level is at 0.3V. However, a high logic/voltage level may refer to any voltage level above a threshold value, and inversely, a low logic level may refer to any voltage level below the threshold value. In addition, there may be more than two logical levels in a cell, transistor, or waveform. As an example, a single waveform may represent four different logical values at different voltage levels.

Execution Module/Resources

FIG. 1 also illustrates execution resources 105, which are to execute transactions. Execution resources 105 may also refer to hardware, logic, or modules to support transactional execution. As an example, execution resources 105 are to execute a first transaction and a second transaction nested in the first transaction. A transaction is nested within another transaction, when either in software or hardware, a begin transaction demarcation for an inner transaction is within a transaction demarcation for an outer transaction.

Other common modules, logic, and functional units not illustrated in FIG. 1 may also be included, but are not required to be included, in processor 100, such as any one or any combination of the following: a data path, an instruction path, a virtual memory address translation unit (a translation buffer), an arithmetic logic unit (ALU), a floating point calculation unit capable of executing a single instruction or multiple instructions, as well as capable to operate on single or multiple data operands in serial or in parallel, a register, an interrupt controller, an advanced programmable interrupt controller (APIC), a pre-fetch unit, a fetch unit, a decode unit, a cache, an instruction retirement unit, an instruction re-order unit, and any other logic that is be used for fetching, executing, or operating on instructions and/or data.

Transactions

Transactional execution usually includes grouping a plurality of instructions or operations into a transaction, atomic section of code, or a critical section of code. In some cases, use of the word instruction refers to a macro-instruction which is made up of a plurality of micro-operations. There are commonly two ways to identify transactions. The first example, includes demarcating the transaction in software. Here, some software demarcation is included in code to be identified during execution. In another embodiment, which may be implemented in conjunction with the foregoing software demarcation, transactions are grouped by hardware or recognized by instructions indicating a beginning of a transaction and an end of a transaction.

In a processor, a transaction is either executed speculatively or non-speculatively. In the second case, a grouping of instructions is executed with some form of lock or guaranteed valid access to shared memory locations to be accessed. In the alternative, speculative execution of a transaction is more common, where a transaction is speculatively executed and committed upon the end of the transaction. A pendancy of a transaction, as used herein, refers to a transaction that has begun execution and has not been committed, i.e. pending. For example, if a begin transaction instruction is executed for an outer transaction and then another begin transaction instruction is executed for a nested inner transaction, the inner nested transaction is still pending until an associated end transaction instruction is executed and the transaction is committed. Therefore, any accesses at the level of the outer transaction are performed during a pendancy of the outer transaction, and the outer transaction is still pending until it is committed or aborted.

Transactional execution, previously, included two basic steps: (1) check a state of a lock associated with a memory access; and (2) validate memory locations accessed before committing the transaction. In fact in a purely software transactional execution environment a software transactional memory (STM) maintains an array of locks, which every memory location is mapped to through some association, such as a hashing function. Usually, upon an access in a transaction, the STM checks a lock, remembers values associated with the location to be accessed and the lock, and before committing the transaction validates whether the lock has been acquired by another transaction during execution. More information on a purely software implemented STM may be found in "McRT-STM: A High Performance Software Transactional Memory System for a Multi-core Runtime," by Bratin Saha, Ali-Reza Adl-Tabatabai, Richard L. Hudson, Chi Cao Minh, and Ben Hertzberg, presented at the Proceedings of Principles and Practice of Parallel Programming (PPoPP) 2006.

Acceleration Module

Referring still to FIG. 1, acceleration module 120 is shown coupled to memory 110. However, a module may be implemented in hardware, software, firmware, or any combination thereof. Furthermore, module boundaries commonly vary and functions are implemented together, as well as separately in different embodiments. As an example, which is discussed in more detail below, acceleration module 120 re-vectors execution in a transaction to a software based barrier in lock module 115, such as a lock associated with a line in memory 110, based on a transaction bit associated with the line of memory 110 to be accessed in the transaction. Additionally, acceleration module 120 may include logic to generate an interrupt if a line in memory 110, which is accessed during a transaction, is evicted before commitment, and a handler executing on execution resources 105 to handle the interrupt and abort a transaction.

In another example, acceleration module 120 includes logic to set a state, such as a carry flag, based on a transaction bit associated with memory line 110, a software application to inspect the carry flag and decide whether or not to invoke a barrier, and a counter to keep count of a number of lines that were accessed and evicted inside a transaction.

From these examples, it is readily apparent that acceleration module 120 may include hardware, such as a transaction bit, software, such as an array of locks maintained in a memory, or firmware, as well as vary across boundaries, such as including lock module 115, a transaction bit which is present in memory 110, logic in processor 100 to generate an eviction interrupt or set a carry flag, a counter to keep track of the number of memory lines accessed inside a transaction, and a handler executed on execution resources 105.

In one embodiment, acceleration module 120 is to determine if an access to the shared line is the first access to the shared line during execution of the transaction. Determining if an access to a line, such as line 112 in memory 110, is a first access to line 112 during execution of a transaction may done by any method of tracking accesses to a line of memory.

Transaction Field/Bit

Figure 2:
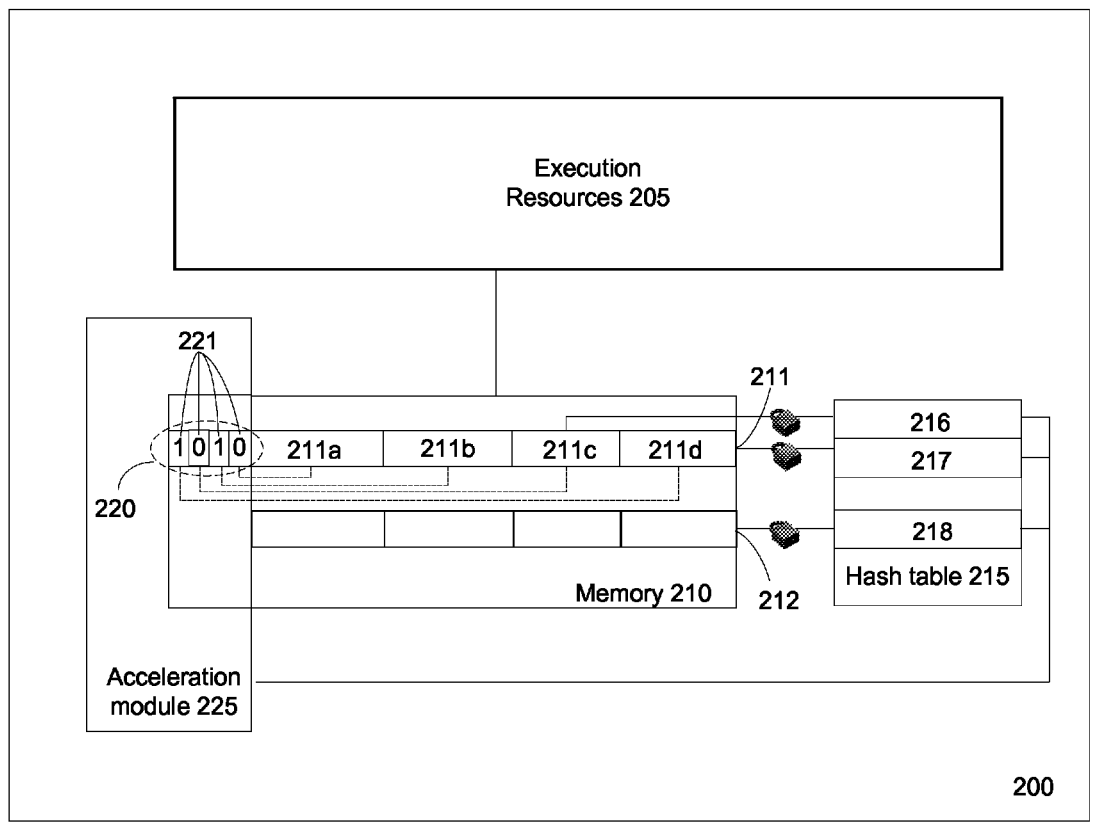
FIG. 2 illustrates another embodiment of a processor for providing accelerated transactional execution.

In one, embodiment each line of memory 110 is associated with a transaction field. Turning quickly to FIG. 2, transaction field 220 is illustrated as part of acceleration module 225. Transaction field 220 is associated with shared memory line 211 in memory 210 and is to represent whether memory line 211 has been previously accessed during execution of a transaction or is being accessed for the first time.

Transaction field 220 may be implemented in hardware, software, or firmware. In one embodiment, transaction field 220 includes a bit or a plurality of bits within shared memory line 211. In the example illustrated in FIG. 2, transaction field 220 are the four most significant bits in a cache line of cache 210. However, a transaction field is not so limited, as it may be implemented in a register, local memory, or other storage device on processor 200 and associated with cache line 211 through a mapping of bits 221 to line 211.

Assuming shared memory 210 is a cache, each cache line, such as line 211, is capable of storing a plurality of elements. In the example shown, cache 211 is capable of storing for elements, 211a, 211b, 211c, and 211d. An element as discussed above may include any instruction, operand, grouping of logical values, or any combination thereof. As a specific example, cache line 211 includes an instruction stored in 211a requiring the addition of two data operands stored in 211b and 211c, and the result is to be stored in 211d.

Here, transaction field 220 includes four transaction bits, which are shown as transaction bits 221. Each one of transaction bits 221 correspond to an element in line 211, as illustrated with the dashed lines from transaction bits 221 to elements 211a-211b. As a consequence, it is able to be determined whether an access to a single element in line 211 is being accessed for the first time or has been previously accessed during the transaction. However, any configuration or number of bits or values in access field 220 may represent a first or subsequent access to any one, combination, or all of the elements in line 211. As an example, when two bits are used, the four combinations of 00, 01, 11, and 10 are used to reference each element.

To illustrate how an access field, such as access field 220, may operate without complicating and obscuring the discussion refer back FIG. 1, where operation of a single transaction bit, not specifically shown, will be discussed. It is readily apparent that an access field with a plurality of bits and shared memory lines with a plurality of elements may operate in a very similar manner as in the example below. Therefore, assume there is a transaction bit associated with each line in memory 110. Association of a transaction bit with line 111 includes the transaction bit being a part of line 111 or elsewhere in processor 100 and mapped to line 111.

By default the transaction bit is set to a first value, such as a first logical value. In this default state, the transaction bit represents that cache line 111 has not been accessed during execution of a transaction, i.e. during a pendancy of a transaction. Upon an access to cache line 111, which includes a write, store, read, or load to cache line 111 or a system memory location associated with cache line 111, the transaction bit is set to a second value, such as a second logical value. In one embodiment, the first value is a high logical value and the second value is a low logical value. Alternatively, the first value is a low logical value and the second value is a high logical value. Analogously, in an access field with a plurality of transaction bits, each bit may be set or cleared to represent whether an element in a shared memory line has been accessed.

Consequently, if the transaction bit associated with line 111 is checked, and the transaction bit represents a first value, then cache line 111 has not been accessed during a pendancy of the transaction. Inversely, if the transaction bit represents a second value, then cache line 111 has been previously accessed during the transaction. Upon commitment of the transaction, the bits set to the second value are cleared to ensure the values are set to the first value, i.e. the default state. In one embodiment, a resource ID, such as a core ID or thread ID, as well as a transaction ID may also be stored or associated with the transaction bit to ensure which transaction is accessing cache line 111 or previously accessed cache line 111. The acceleration of transactional execution based on a first or subsequent access is illustrated below through optimization of re-vectoring to barriers before accessing locations in shared memory and in validation of those locations before committing a transaction.

Barriers/Lock Module

In one embodiment, barriers, locks, meta-data, or instrumentation code associated with lines in memory 110 are checked based on whether accesses to those lines are the first accesses to the lines or subsequent accesses, i.e. not the first accesses, to those lines during execution of a transaction. In the embodiment of a system section, an example of re-vectoring to a barrier associated with a line of memory is discussed in detail. A barrier includes any method of impeding access to a shared memory line/location, any execution of another section of code not within a transaction associated with the shared memory line/location, or access to other data, such as meta-data, associated with the shared memory line/location.

As a first example, a barrier includes a physical tri-state or other hardware blocking mechanism. As another example, a barrier includes updating a state of a carry flag associated with a shared location. A barrier may include meta-data as well. Meta-data is any logical values or data stored in a location associated with the shared memory location. One example of meta-data is a lock, where the location of a lock stores data to represent a state of the lock. Independently, the data stored may not have a specific meaning, but by construct, though either hardware or software, the value of the data stored exhibits the functionality of a lock. Therefore, the use of meta-data is not limited to the examples of locks discussed below, but may include any data accessed upon a first access to a shared memory line. In one embodiment, a lock module, such as lock module 115, is a barrier. In addition, a barrier may also include bookkeeping associated with validating memory locations before committing transactions, as discussed below in the commitment module section.

Lock module 115 is illustrated in processor 100 and coupled to memory 110, but it is not so limited. In one example, lock module 115 includes an array of locks. In one embodiment, the array of locks are an array of software locks stored in a memory, such as a local memory on processor 100 or a system memory coupled to processor 100. Here, the use of the term lock refers to a programming construct to not allow access to a resource, processor, logical processor, core, or thread, based on the lock or a value represented by the lock.

Referring again to FIG. 2, one embodiment of lock module 115 is illustrated where an array of locks, i.e. hash table 215, is stored in transactional memory. Lock 218 is associated with line 212 in memory 210, while locks 216 and 217 are associated with elements 211c and 211d, respectively. Association of locks with shared memory lines, locations, or elements may be done through any mapping or other technique for associating two locations. In one embodiment, a lock is associated with a shared memory line through a hash table, such as hash table 215. In this case, an array of locks is stored in memory and indexed by some portion of an address referencing the shared memory line. For example, a first number of lower bits of a virtual or linear address are masked off to get a cache line address referencing line 212, and that cache line address is used to index lock 218 within the array of locks.

A lock, such as lock 218, may have multiple states. As a specific illustrative example, a software lock, such as lock 218, is in an owned state or an un-owned state. For example, when a transaction is to write to line 212, it acquires lock 218 and writes to line 212. When acquired by another transaction, lock 218 is in an owned state, and line 212 is not accessible by other transactions or resources. Common methods of waiting, back-offs, parallel execution, and other techniques may be used if a transaction or resource is not able to acquire a lock because it is an owned state. Any method of representing a state may be used to represent that lock 218 is owned or un-owned, such as representative values, words, or bit patterns. In one embodiment, when lock 218 represents a first value, lock 218 and line 212 are owned, and when lock 218 represents a second value, lock 218 and line 212 are un-owned.

The following example is to illustrate how a programming construct utilizes lock 218, as a barrier to line 212. When un-owned, lock 218 represents an odd version value, such as the number three. Upon a transaction acquiring lock 218, the transaction or a resource writes an even number, such as the number four, to represent that lock 218 is owned. If the transaction updates line 212, upon releasing the lock, it writes the next odd version number, i.e. the number five, to lock 218 to represent that: (1) lock 218 is again un-owned, since it currently stores an odd number; and (2) line 212 was updated from the time the last odd version value of three was stored in lock 218.

Previously, a purely software transactional memory system potentially checks the state of locks before each access to locations in memory, remembers version values stored in the locks, and performs validation on every location every time before committing the transaction. However, in one embodiment, acceleration module 225 checks a state of lock 218 before an access to line 212, if the access is the first access to line 212 during execution of a transaction. As stated above, a first access to line 212 during execution of a transaction may be represented by a transaction field/bit associated with line 212 representing a first value. Essentially, a locking module, such as locking module 115, is invoked to check lock 218, if the transaction field/bit associated with line 212 represents the first value.

As an example, re-vectoring to a barrier or checking a lock, if the transaction field/bit associated with line 212, is initiated by a synchronous or asynchronous event. Upon an access to line 212 within a transaction, a synchronous indication, such as setting a carry flag to be later inspected, or an asynchronous generation of a signal, such as a transaction miss interrupt, occurs to represent that the transaction field/bit represents the first value.

In the first situation, where a synchronous mechanism is utilized, another state, such as a carry flag, is set, if the transaction field associated with line 212 represents that this access is the first access during execution of the transaction. The access to line 212 then proceeds as normal, and later, upon checking with carry flag, with an application or handler, a determination is made of whether to proceed to acquiring a lock, storing version values, and performing validation.

In the situation where an interrupt is generated, a handler, which may be executed on processor 200 or some firmware associated with processor 200, handles the interrupt by re-vectoring execution to the barrier, such as checking lock 218. Note that a first access to line 212 is not the only event that may cause a re-vector to a barrier, i.e. checking of lock 218, or generation of an interrupt. For example, if a cache-miss occurs, i.e. the requested line is not present in memory 210 and is to be fetched from a system memory, then the same "first access" method of locks/barriers may be invoked/repeated. A first access or cache miss is also referred to herein as a transaction miss notification.

In contrast to a "first access", in one embodiment, if the access to line 212 is not the first access to line 212 during execution of the transaction, but is rather a subsequent access to line 212, then locking module 115 is not invoked and lock 218 is not checked before accessing line 212. Or in the alternative, the synchronous notification through a mechanism such as setting a carry flag does not occur. As a result, access to line 212 is allowed, without invoking lock module 115, i.e. checking lock 218, if the transaction field/bit associated with line 212 represents a second value. In one embodiment, allowing access to line 212 is transparent, as line 212 is simply updated by or provided to execution resources 205 without checking lock 218. As can be seen in this embodiment, transactional execution is potentially accelerated, where multiple accesses to the same line in a shared memory occur within a single transaction, as subsequent accesses within the transaction to the same line need not encounter a barrier associated with the line.

Acceleration module 225 and other modules, such as lock module 115 and eviction tracking module 125 shown in FIG. 1, as well as a commitment module may operate in a plurality of modes, such as a first aggressive mode and a second cautious mode.

In one embodiment, in an aggressive mode, a lock module or acceleration module 225 acquires the lock, when it is in an un-owned state, and does not store a version value stored in the lock. As stated in an above example, an odd version value represents that the lock is not owned. Previously, the odd version number would be stored in a transactional memory set to enable validation upon commitment. However, in this aggressive mode, the version value is not stored in a local transaction memory set, after checking the state of the lock and determining that the lock is unowned. Therefore, in one aggressive mode embodiment, instead of doing complex validation before committing a transaction using complex comparison of version values, the transaction is committed, if an eviction notification (synchronous or asynchronous) is not received during a pendancy of the transaction. Eviction and eviction notifications will be discussed in more detail in the eviction module section.

As a first illustrative example, a load instruction in a transaction is executed to access element 211d in line 211. If access field 221 represents that the load instruction is not the first access to element 211d during execution of the transaction, then element 211d is accessed without checking lock 216. However, if access field 221 represents that the load instruction is the first access to line 211 during execution of the transaction, then a transaction miss interrupt is generated or a carry flag is set. A handler handles the transaction miss interrupt by checking lock 216 or an application inspect the carry flag and calls the handler. If an odd version value is stored in lock 216, then the transaction may acquire lock 216 by writing an even value to lock 216. When in an aggressive mode, the odd version value, which was stored in lock 216 before writing the even value to lock 216, is not stored. As discussed later, upon committing the transaction, the version values are not compared, saving the validation cost associated with executing the transaction.

Alternatively, acceleration module 225 and other modules may operate in a cautious mode. For example, an aggressive mode is the default mode of operation, and after aborting or failing a transaction a predetermined number of times, operation is switched to the cautious mode. Note that a cautious mode may instead be the default mode of operation, and operation switches to an aggressive mode, after a predetermined number of successful transactions without contention or eviction notifications. In the cautious mode, upon a transaction miss notification, the same functions of the aggressive mode occur, except the version number stored in lock 216 is stored in a local transaction memory set to enable validation upon committing the transaction. Here, if there is no eviction notification during execution of the transaction then the transaction is committed. However, unlike the aggressive mode, if an eviction notification occurs during the pendancy of the transaction, then the version numbers are stored in the location transaction memory set to validate the transaction, instead of just aborting the transaction.

Continuing the example from above, if the load instruction occurs during operation in a cautious mode, lock 216 is acquired and a version value stored in lock 216 is stored in a local transaction memory read set. If an eviction notification occurs during the pendancy of the transaction, then the version value stored in the local transaction memory read set is validated against a current version value stored in lock 218. If the version value validation is successful, the transaction is committed, and if it is not successful the transaction is aborted.

In one embodiment, stores operate in the same manner in both an aggressive mode and a cautious mode. Here, upon a miss notification, an old value of element 211d is stored/logged in transactional memory and lock 216 is acquired by writing an even number to it. Note that execution time is also potentially reduced in that even stores are checked upon the first access to a line, and not during subsequent stores to the same line.

Eviction Tracking/Commitment Module

As stated above, in an aggressive mode, an eviction notification during execution of a transaction may result in aborting the transaction, while an eviction notification may initiate validation during cautious mode operation. In one embodiment an eviction notification occurs if a line that has been accessed by a transaction, i.e. the transaction access field represents a second value, is evicted. Eviction of a line includes eviction of a shared memory line by a remote resource, a snoop to the shared memory line by a remote resource, an access to the shared memory line invalidating a copy of the shared memory line stored in a transaction memory set associated with the transaction, and/or an eviction due to capacity constraints. Therefore, an access by another transaction evicting the shared memory line, an access by a remote resource, such as another core/logical processor present on processor 200, any other invalidating access, or capacity constraints results in an eviction notification.

Tracking module 125 shown in FIG. 1, is to track eviction notification. In one embodiment, upon an eviction notification event, an eviction notification interrupt is generated, which causes execution to be re-vectored to a handler. Logic or other interrupt generating components may be used to generate the eviction notification interrupt upon detecting an eviction notification event. In another embodiment, a count is maintained of the number of shared memory lines evicted, which had their transaction bits set. An application or handler may later inspect this count and decide whether to re-vector to barriers, such as performing validation based on the count. Here, an eviction notification is generated based on the inspection/query of the number of lines evicted during execution, which may be stored in logic, such as a counter. As stated above, the handler may immediately abort the transaction, abort the transaction at the end of the transaction before commitment, perform validation, and/or commit the transaction.

In one embodiment, eviction tracking module is to abort a transaction, if the eviction tracking module is operating in an aggressive mode and an invalid access, i.e. an eviction notification event, to the shared memory line occurs during execution of the transaction. In contrast, if the eviction tracking module is operating in a cautious mode then the eviction module or commitment module validates the transaction.

A commitment module is to commit the transaction. The boundaries of a commitment module, eviction tracking module, and other modules overlap and include some of the same components. For example, upon commitment, the transaction fields/bits set during execution of a transaction are reset to a first value to assure the next transaction starts from a default state of transaction bits. Similar operation may be done during abort of a transaction before re-execution.

Operation of eviction of lines, commitment, and validation are not discussed in detail to avoid obscuring the invention, as they are well-known techniques within transactional execution. As stated above, validation, in one embodiment, includes validating a local copy of a version number with a current version number stored in a lock. Additionally, the operation of handlers generally and the execution of handler routines on processors with execution resources are not discussed in detail to avoid obscuring the invention. However, in one embodiment, a handler to abort a transaction is capable of rolling back nested transactions at a granularity of one transaction at a time. Execution and rolling-back of nested transactions is discussed in a co-pending application with Ser. No. 11/323,092 entitled, "Software Assisted Nested Hardware Transactions."

An Embodiment of a System

Figure 3:
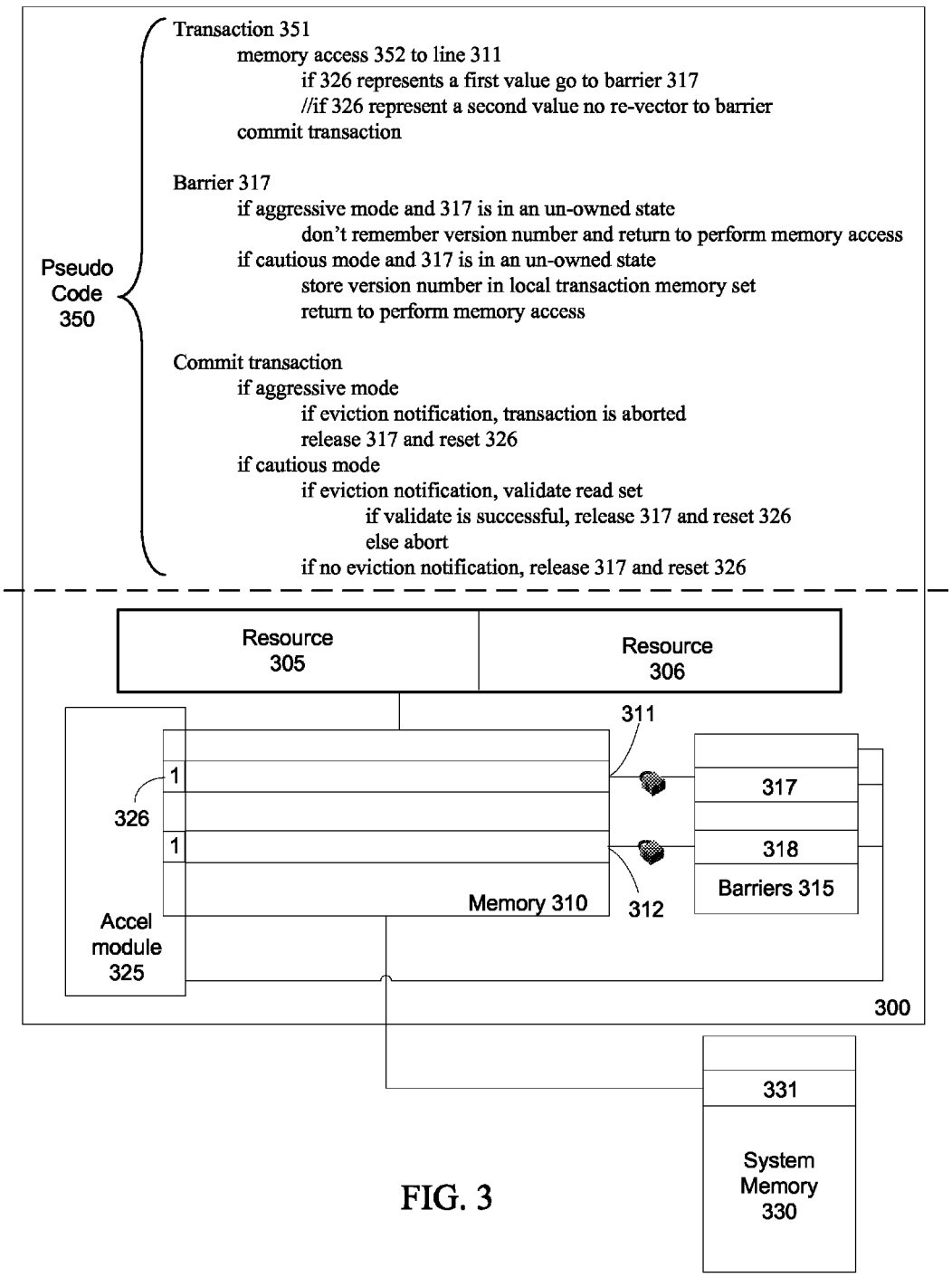
FIG. 3 illustrates an embodiment of an underlying system including a multi-resource microprocessor and a higher layer abstraction of pseudo code for accelerating execution of a transaction.

Turning to FIG. 3, an embodiment of a system with an abstraction of pseudo code to illustrate operation of the system is illustrated. Multi-resource processor 300 is coupled to system memory 330. Although not shown, system memory 330 may be coupled to processor 300 through other components or devices, such as a memory controller hub. System memory includes any memory for storage in a system such as a SRAM, DRAM, double data rate (DDR) RAM, non-volatile (NV) RAM, EDO RAM, or other memory device. System memory 330 is to store elements, such as instructions and data operands to be executed by processor 300. In one embodiment, system memory stores a plurality of instructions that are to be grouped into transactions.

Pseudo code 350 illustrates a simplified exemplary operation of processor 300 to accelerate transactional execution. Transaction 351, which includes a plurality of instructions or operations, is to be executed by resources 305 and 306. Resources 305 are any combination of the following: a core, a thread, a logical processor, or other execution resources. Often a transaction, such as transaction 351 is to be executed by one resource or identified with one resource of the plurality of resources. One of the accesses within transaction 351 is memory access 352, which includes an access to line 311 in shared memory 310. A memory access includes a write, read, store, or load to/from shared memory line 310.

Upon executing access 352, transaction bit 326 is checked to determine, if access 352 is a first access to line 311 during execution of transaction 311. If transaction bit 326 represents a second value, which is either a high or low logical value depending on the choice in design, then line 311 is accessed without re-vectoring execution to barrier 317, which is associated to line 311 through a hashing function into array of barriers 315. Storing the second value in transaction bit 326 represents that a previous access to line 311 occurred during execution of transaction 351. Therefore, barrier 317 is not re-checked.

In contrast, if transaction bit 326 is a second value to represent access 352 being the first access to line 311 during execution of the transaction or a cache-miss to line 311 occurs, then execution is re-vectored to barrier 317. In one embodiment, execution is re-vectored by generating a user-level interrupt based on transaction bit 326 representing the second value. In another example, a carry flag associated with transaction bit 326 or with line 311 is set, which is then inspected by an application to decide whether to re-vector execution to a handler. Assuming barrier 317 includes a lock in an array of locks maintained in a memory, then lock 317 is checked to determine if it is an owned or un-owned state. Here, an owned state is represented by an even value and transaction 351 is not able to acquire a lock to line 311 through lock 317. In contrast, an un-owned state is represented by an odd version number, such as a binary representation of a decimal number nine.

If acceleration module, which includes transaction bits and an executing software transactional memory handler, is operating in an aggressive mode, then lock 317 is acquired through writing an even number to lock 317. Yet, the version number in lock 317 is not remembered/stored. However, if in a cautious mode, the version number is stored in a local transaction memory set, such as a read set for a load operation. Next, in both operational modes execution flow is returned to perform the memory access 352 to line 311.

If during execution an eviction notification is received, then transaction 351 is either aborted at that time or upon commitment. Here, the portion of pseudo code 350 is shown under a commit transaction section; however, an eviction notification may be generated and received in the middle of execution of a transaction before commitment and the transaction may be aborted at that time. For example, if line 311 is snooped by, evicted by, or invalidly accessed by resource 306, which is not tasked with executing transaction 351, then an eviction notification interrupt is generated. A handler receiving the interrupt may abort the transaction at that time or wait until an attempt to commit transaction 351 before handling the interrupt. Alternatively, a counter is used to keep track of the number of lines evicted that had their associated transaction bit set. Anytime during the pendancy of the transaction, the counter may be queried and aborted based on the value of the counter.

In an asynchronous interrupt case, if in an aggressive mode and an eviction interrupt is received, then transaction 351 is aborted and potentially restarted. The transaction bits set previously by transaction 351 are reset/cleared and locks obtained are released. In contrast, if no eviction interrupt is received during aggressive mode, transaction 351 is committed, which potentially saves the execution time of validating each address accessed during transaction 351. Upon commit, the locks are still released and the transaction bits reset. If operating in a cautious mode and an eviction interrupt is received then the read set is validated, which is enabled by the previous stores of version numbers in the read set from above. If the validation is successful then transaction 351 is committed including releasing the locks and clearing the transaction bits. If the validation is not successful, transaction 351 is aborted and restarted. Yet, if no eviction interrupt is received, even in cautious mode, validation may be spared and transaction 351 committed without incurring extra validation execution time.

An Embodiment of a Method for Accelerating Transactional Execution

Figure 4:
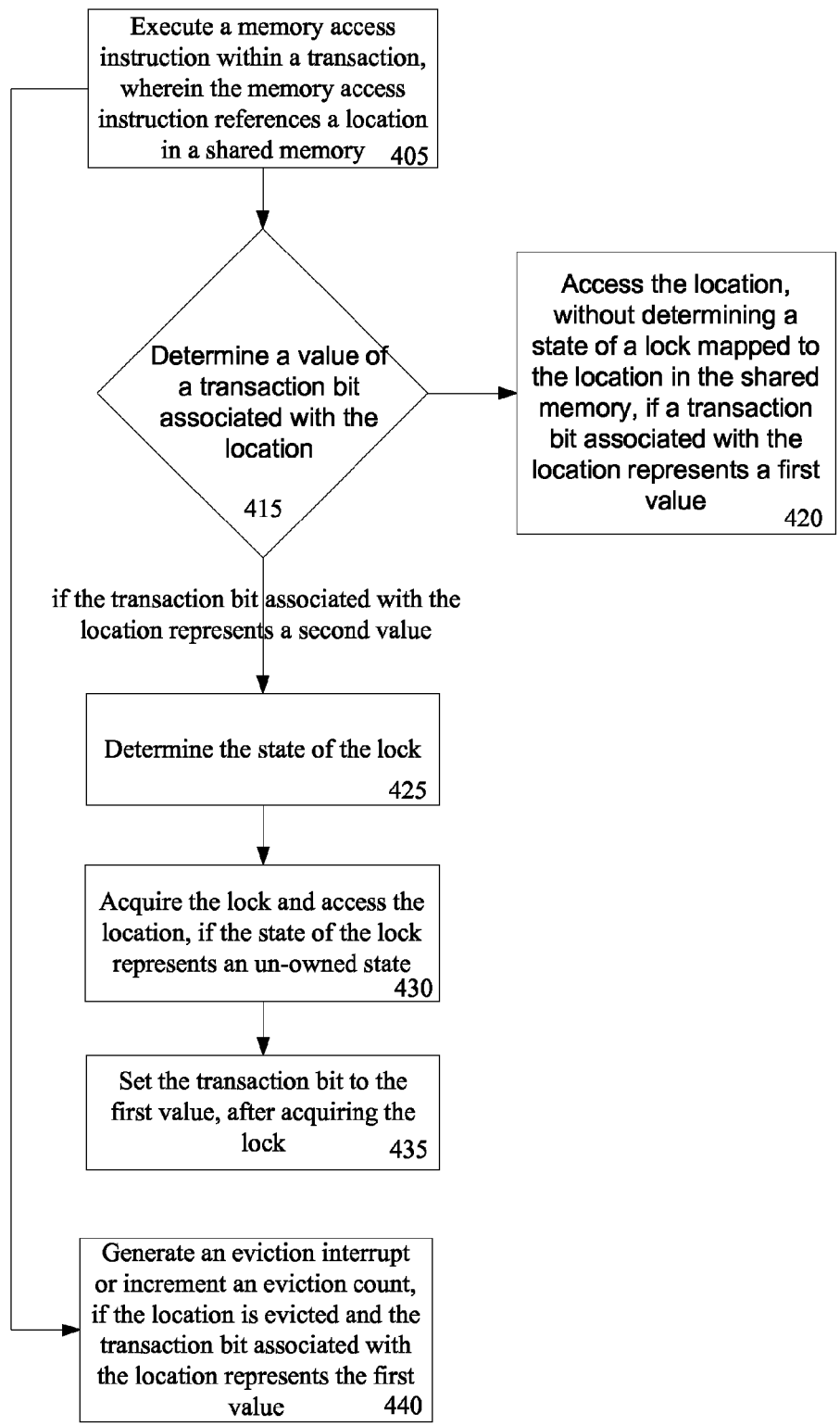
FIG. 4 illustrates an embodiment of method for accelerating execution of a transaction.

Turning to FIG. 4, an embodiment of a flow diagram for a method of accelerating transactional execution is illustrated. In flow 405, a memory access instruction within a transaction is executed. The memory access instruction references a location in the shared memory. The reference to the location in the shared memory may include a virtual or linear address referencing the shared memory location itself or some external memory location associated with the shared memory location. As stated above the shared memory includes any shared memory device on a processor, such as a cache, register, or other storage element.

Next, in flow 415 a value of a transaction bit associated with the shared memory location is determined. The transaction bit may be associated through a mapping to the shared memory location, or it may be a part of the shared memory location. Determining the value of a transaction bit includes any known method of reading/detecting the value of a storage cell, such as a logic level. For example, upon executing the access instruction, the value is read from the transaction bit. If the transaction bit associated with the location is a first value then the location is accessed without determining a state of a lock mapped to the location in the shared memory in flow 420. Therefore, the access occurs like a normal load, store, read, or write.

However, if the transaction bit associated with the location represents a second value, then a state of the lock is determined in flow 425. From above, the state of the lock is represented by values representing owned or un-owned states. As an illustrative example, the lock is owned, if an even value is stored in the lock, and an odd version value if the lock is available, i.e. not owned. Alternatively, another value, such as a transaction ID or resource ID, may be written to the lock to represent it is owned. In flow 430, the lock is acquired and the location is accessed, if the state of the lock represents an un-owned state. Continuing the illustrative example, a lock is acquired by writing an even number to the lock. Finally, the transaction bit associated with the location is set to the first value to represent the location has been accessed during execution of the transaction a first time already.

Note, that the flow is illustrated in a linear fashion; however, any flow may occur in a different order as shown. For example, immediately after determining the value of the transaction bit represent the second value, the transaction bit may be set to the first value to represent that it has been accessed a first time.

In one embodiment, if operating in an aggressive mode, the version value stored in the lock to represent an un-owned state is not stored before accessing the location. Alternatively, in a cautious mode, the version value stored in the lock to represent an un-owned state is stored in a local transaction memory set before accessing the location.

In flow 440, which may also occur at any time during the flow shown in FIG. 4, an eviction interrupt is generated, if the location is evicted and the transaction bit associated with the location represents the first value. Here, if the location has been accessed during execution of the transaction, as represented by the transaction bit storing the second value, and is evicted, then an eviction interrupt is generated. This interrupt may be generated at the time of the eviction and handled at that time or later. Alternatively, in flow 440 a counter is incremented to keep track of a number of line evicted during execution of the transaction. The counter may be later examined or queried to decide storing of versions, validation, and commitment, as discussed below.

In an aggressive mode and in the cautious mode, the transaction is committed if no eviction occurs during execution of the transaction. Additionally, in the aggressive mode, the transaction is aborted if an eviction does occur during execution of the transaction. However, in the cautious mode the transaction is validated before committing the transaction, if an eviction interrupt is generated. If the validation is successful then the transaction is committed, otherwise, it is aborted and restarted. Note either the aggressive mode or the cautious mode is the default mode, as discussed above.

Another Embodiment of a Method for Accelerating Transactional Execution

Figure 5:
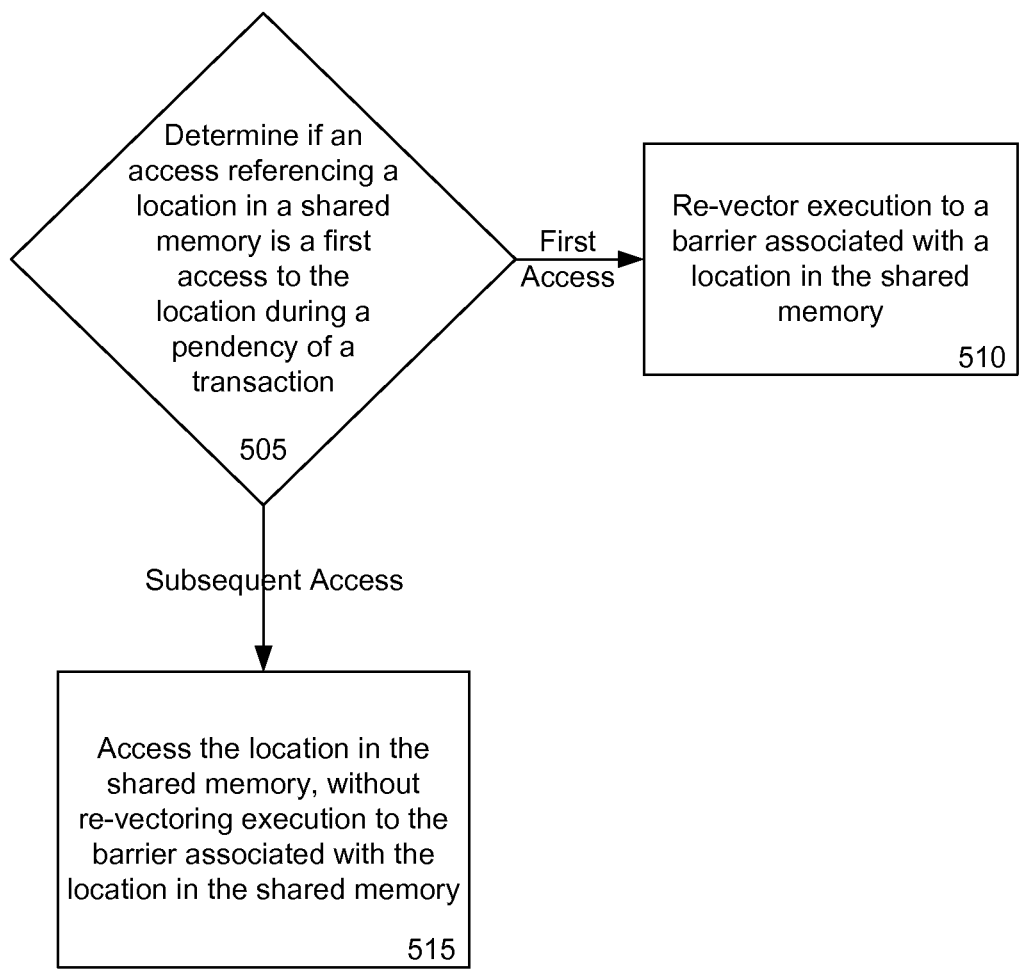
FIG. 5 illustrates another embodiment of method for accelerating execution of a transaction.

Referring lastly to FIG. 5, another embodiment of a flow diagram for a method of accelerating transactional execution is illustrated. In flow 505, it is determined if an access referencing a location in a shared memory is a first access to the location during a pendancy of a transaction. In one embodiment, the location is a shared memory line. In another embodiment, a shared memory line is capable of storing a plurality of elements, such as instructions, operands, data operands, logical values, and any combination thereof, and an element in the shared memory line is the location.

The location is associated with a transaction field, which has at least a transaction bit. Similar to the operation above, the transaction bits/transaction field are/is used to determine if the access is a first access to the shared memory line or element within the shared memory line during a pendancy of the transaction.

In flow 510, if it is the first access to the shared memory line or the element in the shared memory line, then execution is revectored to a barrier associated with a location in the shared memory. The barrier includes any locking or access mechanism associated with a shared memory such as a cache. In one embodiment, the barrier includes a lock within an array of locks maintained in software. The operation of locks and barriers are similar to the operation of locks and barriers discussed above in reference to FIGS. 1-3. For example, re-vectoring execution includes executing a handler to handle a transaction miss interrupt, wherein the execution of the handler is the re-vectoring of execution to a barrier, even without accessing or checking a lock. In the alternative, re-vectoring execution includes checking a state of a carry flag and calling a handler to handle the transaction miss.

Otherwise, in flow 515, if the access is a subsequent access to the shared memory line or the element in the shared memory line, then the location in shared memory line is accessed without re-vectoring execution to the barrier associated with the location in the shared memory. Here, an operation such as a load or store operates normally with out barriers.

As illustrated above, acceleration of transactional execution is accomplished in a number of ways. For example, a barrier, such as lock within an array of software locks, is only accessed upon a first access to a shared memory location within a transaction. Subsequent accesses may directly access the location without incurring the execution hit of accessing a barrier. Furthermore, different operational modes provide different levels of acceleration. In an aggressive mode, version numbers of locks are not stored, so no validation execution delay is incurred upon committing the transaction. In fact, the transaction is just committed if no eviction interrupts occur during execution of a transaction. In contrast, in a cautious mode, version numbers are stored to perform validation if necessary. However, just as in the aggressive mode, the execution hit associated with validation is not incurred if no eviction interrupts are generated during execution of the transaction. Therefore, both the accessing of locations and the barriers associated with those accesses are accelerated, as well as the potential validation of a transaction before commitment is accelerated.

The embodiments of methods, software, firmware or code set forth above may be implemented via instructions or code stored on a machine-accessible or machine readable medium which are executable by a processing element. A machine-accessible/readable medium includes any mechanism that provides (i.e., stores and/or transmits) information in a form readable by a machine, such as a computer or electronic system. For example, a machine-accessible medium includes random-access memory (RAM), such as static RAM (SRAM) or dynamic RAM (DRAM); ROM; magnetic or optical storage medium; flash memory devices; electrical, optical, acoustical or other form of propagated signals (e.g., carrier waves, infrared signals, digital signals); etc.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a decode unit adapted to decode one or more instructions, the one or more instructions including a transaction memory access instruction to reference a data address;
a cache memory including (i) a cache data location corresponding to the data address and adapted to hold a data value from the data address and (ii) a cache lock location adapted to hold a transactional lock value to be associated with the cache data location, wherein the cache lock location is indexed within a hash table as a function of a hashed portion of the data address corresponding to the cache data location, and wherein the transaction lock value comprises at least one of (i) a locked value to indicate the data value is owned by a transaction and (ii) a version value to indicate the data value is not owned by a transaction;
a hardware field to be associated with the cache data location, wherein the hardware field is adapted to hold an acceleration value; and
execution logic, in response to the decode unit decoding the one or more instructions, being adapted to
determine if the acceleration value includes an accessed value to indicate the cache data location has been previously accessed during a transaction, wherein the transaction, by default, is to be executed in an aggressive mode and is to be executed in a cautious mode in response to the transaction being aborted a first number of times;
update the cache lock location to a locked value and not log a version value to be associated with the data address in a local transaction memory set in response to (i) the acceleration value including an un-accessed value to indicate the cache data location has not been previously accessed during the transaction, and (ii) the transaction being executed in the aggressive mode;
update the cache lock location to a locked value and log a version value to be associated with the data address in the local transaction memory set in response to (i) the acceleration value including the un-accessed value to indicate the cache data location has not been previously accessed during the transaction, and (ii) the transaction being executed in the cautious mode; and
vector execution of the execution logic so as not to update the cache lock location to the locked value and not log the version value in the local transaction memory set in response to the acceleration value including the accessed value to indicate the cache data location has been previously accessed during the transaction.

2. The apparatus of claim 1, further comprising eviction tracking logic to track an eviction notification during execution of the transaction with the execution logic, wherein the decode unit is further adapted to decode transaction abort instructions to abort execution of the transaction in response to the transaction being associated with an aggressive mode of execution and the eviction tracking logic tracking the eviction notification during execution of the transaction and to validate the transaction in response to the transaction being associated with a cautious mode of execution and the eviction tracking logic tracking the eviction notification during execution of the transaction.

3. The apparatus of claim 2, wherein the eviction notification includes a notification indicating an eviction selected from a group consisting of an eviction of the cache data location included in the cache memory by a remote resource, an eviction of the cache data location due to capacity constraints, an eviction of the cache data location due to a snoop to the cache data location by a remote resource, and an eviction of the cache data location due to an access to the cache data location invalidating a copy of the cache data location to be held in a local transaction memory set associated with the transaction.

4. The apparatus of claim 1, wherein the hardware field includes a transaction bit associated with the cache data location, and wherein the execution logic is further adapted to update the transaction bit to the accessed value in response to the acceleration value including the un-accessed value to indicate the cache data location has not been previously accessed during the transaction and the decode unit decoding the one or more instructions.

5. An apparatus comprising: a processor including
a cache memory including a plurality of cache lines, each cache line of the plurality of cache lines is capable to store a plurality of elements, each of the plurality of elements is individually selected from a group consisting of an instruction, an operand, and a grouping of logical values;
execution resources coupled to the cache memory to execute a transaction; and
an acceleration module to initiate a check of a software maintained lock associated with a cache line before an access to the cache line in response to a hardware transaction field associated with the cache line holding a first value and to not initiate a check of the software maintained lock before the access to the cache line in response to the hardware transaction field holding a second value, wherein the hardware transaction field includes a plurality of transaction bits, each of the transaction bits corresponding to one of the plurality of elements in the cache line, and wherein the cache line is associated with the software maintained lock through mapping at least one element of the plurality of elements in the cache line to the software maintained lock.

6. The apparatus of claim 5, wherein the software maintained lock is to be held in a software maintained hash table, the software maintained lock being indexed in the hash table with a hash value based on at least a portion of an address referencing the cache line.

7. The apparatus of claim 5, wherein the first value is a high logical value to indicate the cache line has not been accessed during execution of the transaction and the second value is a low-logical value to indicate the cache line has been accessed during execution of the transaction.

8. The apparatus of claim 5, wherein the access to the cache line includes a load from the cache line, and wherein the acceleration module, when operating in a first mode, is not to store a local copy of a version number to be held in the software maintained lock, before acquiring the software maintained lock, and when operating in a second mode, is to store a local copy of the version number to be held in the software maintained lock, before acquiring the software maintained lock.

9. The apparatus of claim 8, wherein the processor further includes a commitment module, the commitment module to
validate the local copy of the version number to determine if the cache line has been evicted before the transaction is committed in response to the acceleration module operating in the second mode; and
reset the hardware transaction field to the first value, upon committing the transaction.

10. The apparatus of claim 5, wherein the execution resources are also to execute a handler routine to abort the transaction in response to the cache line being evicted before the transaction is committed, and wherein the handler routine is capable of rolling back nested transactions at a granularity of one transaction at a time.

11. The apparatus of claim 5, wherein the processor is selected from a group consisting of: a host processor, a microprocessor, a processing core, a logical processor, an embedded processor, a multi-threaded processor, and a multi-core processor.

12. A non-transitory machine readable medium including program code which, when executed by a machine, causes the machine to perform the operations of:
determining if a hardware transaction value associated with a memory address referenced by a transactional memory access operation within a transaction indicates that the memory address has been previously accessed during a pendency of the transaction;
checking a software maintained lock associated with the memory address before performing the transactional memory access operation in response to determining the hardware transaction value does not indicate that the memory address has been previously accessed during the pendency of the transaction;
not checking the software maintained lock associated with the memory address before performing the transactional memory access operation in response to determining the hardware transaction value indicates that the memory address has been previously accessed during the pendency of the transaction;
wherein the software maintained lock is to provide synchronized access to a memory location associated with the memory address;
wherein the transactional memory access operation within the transaction, when executed, is to access the memory location;
wherein the software maintained lock to provide synchronized access to the memory location comprises the software maintained lock to hold an owned value in response to the memory location being locked and an un-owned version value in response to the memory location being unlocked;
wherein checking the software maintained lock before performing the transactional memory access operation comprises determining if the software maintained lock is holding the owned value or the un-owned version value and not performing the transactional memory access operation until determining the software maintained lock is holding the un-owned version value;
wherein the memory location comprises a cache memory location within a cache memory of a microprocessor; and
wherein the un-owned version value is not to be stored in a local transactional set for the current transaction before updating the software maintained lock to the owned value to acquire a lock on the cache memory location when the microprocessor is in an aggressive transactional execution mode and the un-owned version value is to be stored in the transactional set for the current transaction before updating the software maintained lock to the owned value to acquire a lock on the cache memory location when the microprocessor is in a cautious transactional execution mode.

13. The machine readable medium of claim 12, wherein the hardware transaction value associated with the memory address comprises a hardware annotation bit for a cache line associated with the memory address; and
wherein determining if the hardware annotation bit indicates that the memory address has been previously accessed during a pendency of the transaction comprises:
determining the hardware annotation bit indicates that the memory address has been previously accessed during a pendency of the transaction in response to the hardware annotation bit representing an accessed logical value; and
determining the hardware annotation bit does not indicate that the memory address has been previously accessed during a pendency of the transaction in response to the hardware annotation bit representing a default un-accessed logical value.

14. A method comprising:
   determining if a hardware transaction value associated with a memory address referenced by a transactional memory access operation within a transaction indicates that the memory address has been previously accessed during a pendency of the transaction;
   checking a software maintained lock associated with the memory address before performing the transactional memory access operation in response to determining the hardware transaction value does not indicate that the memory address has been previously accessed during the pendency of the transaction;
   not checking the software maintained lock associated with the memory address before performing the transactional memory access operation in response to determining the hardware transaction value indicates that the memory address has been previously accessed during the pendency of the transaction;
   wherein the software maintained lock is to provide synchronized access to a memory location associated with the memory address;
   wherein the transactional memory access operation within the transaction, when executed, is to access the memory location;
   wherein the software maintained lock to provide synchronized access to the memory location comprises the software maintained lock to hold an owned value in response to the memory location being locked and an un-owned version value in response to the memory location being unlocked;
   wherein checking the software maintained lock before performing the transactional memory access operation comprises determining if the software maintained lock is holding the owned value or the un-owned version value and not performing the transactional memory access operation until determining the software maintained lock is holding the un-owned version value;
   wherein the memory location comprises a cache memory location within a cache memory of a microprocessor; and
   wherein the un-owned version value is not to be stored in a local transactional set for the current transaction before updating the software maintained lock to the owned value to acquire a lock on the cache memory location when the microprocessor is in an aggressive transactional execution mode and the un-owned version value is to be stored in the transactional set for the current transaction before updating the software maintained lock to the owned value to acquire a lock on the cache memory location when the microprocessor is in a cautious transactional execution mode.

15. The method of claim 14, wherein the hardware transaction value associated with the memory address comprises a hardware annotation bit for a cache line associated with the memory address; and
   wherein determining if the hardware annotation bit indicates that the memory address has been previously accessed during a pendency of the transaction comprises:
      determining the hardware annotation bit indicates that the memory address has been previously accessed during a pendency of the transaction in response to the hardware annotation bit representing an accessed logical value; and
      determining the hardware annotation bit does not indicate that the memory address has been previously accessed during a pendency of the transaction in response to the hardware annotation bit representing a default un-accessed logical value.

* * * * *